US006957268B1

(12) United States Patent
Odom et al.

(10) Patent No.: US 6,957,268 B1
(45) Date of Patent: Oct. 18, 2005

(54) METHOD AND SYSTEM FOR TRANSFERRING FILES FROM PRIMARY SYSTEM TO SECONDARY SYSTEMS

(75) Inventors: Joel Van Odom, Roswell, GA (US); Kevin Robert Cloudt, Alpharetta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 770 days.

(21) Appl. No.: 09/965,058

(22) Filed: Sep. 26, 2001

(51) Int. Cl.[7] ............................................. G06F 15/16
(52) U.S. Cl. ..................... 709/232; 370/443; 370/450; 370/231; 370/235
(58) Field of Search .................. 370/443, 450; 375/377; 709/232, 233

(56) References Cited

U.S. PATENT DOCUMENTS 5,619,544 A * 4/1997 Lewis et al. ................. 375/377
5,844,905 A * 12/1998 McKay et al. .............. 370/443
6,687,260 B1 * 2/2004 Peace .......................... 370/450

* cited by examiner

Primary Examiner—Viet D. Vu
Assistant Examiner—Dustin Nguyen
(74) Attorney, Agent, or Firm—Merchant & Gould P.C.

(57) ABSTRACT

A method and system for transferring one or more sequentially ordered data files to a plurality of secondary systems that respond after receipt of each file. A clear-to-send (CTS) flag is maintained for each of the secondary systems. A sequence broker reads a clear-to-send flag and, if the CTS flag is asserted, issues a transfer command to a transmit module to transmit a next data file to the secondary system. The sequence broker reads a status file associated with a secondary system and determines which data file, if any, is to be transferred. The sequence broker receives invoking commands from a clear-to-send broker and/or an invoking module for invoking the transfer process.

12 Claims, 6 Drawing Sheets

METHOD AND SYSTEM FOR TRANSFERRING FILES FROM PRIMARY SYSTEM TO SECONDARY SYSTEMS

FIELD OF THE INVENTION

The present invention generally relates to computer communications. More particularly, the present invention relates to transferring data files from a primary computer system to secondary computer systems.

BACKGROUND OF THE INVENTION

Computer systems and communications systems are increasingly relied upon to process massive amounts of data. In the so-called information age, data files are typically transferred, stored, and used in and among computer systems. Frequently, data files are generated and stored in a centralized primary computer system to be transferred to a number of remote secondary systems, which may use the data files for different purposes.

One current approach to transferring a number of files from a primary system to a number of secondary systems involves the primary system transferring one file to all the secondary systems and waiting until all of the secondary systems have received the file before a next file may be transferred. While this approach is generally effective, a problem may arise when all the secondary systems do not process data at the same speed. When this occurs, overall data file transfer time is limited by the response time of the slowest secondary system. Thus, data file transfer speed and efficiency is reduced.

Another problem that has been identified in some data file transfer systems involves the use of protocols by secondary systems that require the secondary systems to give a response to acknowledge receipt of a data file before the secondary system can receive another data file. It has been found that some primary systems do not wait for the receipt acknowledgment before sending another file. As a result, files destined for secondary systems are often not received by the secondary systems, or, if they are received, complications may arise. This problem is particularly acute when the primary system must transfer a sequence of data files to a number of secondary systems that each must send file receipt acknowledgments before receipt of a subsequent file.

One area where the above noted problems have been particularly prevalent is in the telecommunications industry, which frequently utilizes large legacy computer systems that operate at different speeds and utilize the acknowledgment receipt protocol, as described above. In particular these problems have arisen in conjunction with the use of local number portability (LNP) systems. LNP systems typically include LNP databases that have telecommunications customer data files, which are used by telecommunications service providers (TSPs) to allow customers to keep their phone number when they move, switch providers, or change service type. The LNP database files must be transferred from a primary system to a number of remote secondary systems, each of which use the LNP database files for any number of purposes including billing and tracking. The secondary systems are frequently older systems operating at various speeds and utilizing the acknowledgment receipt protocol discussed above. Transfer of the LNP databases has been slow and inefficient because the older secondary systems are capital intensive and not likely to be replaced in the near future. A recent law requiring all TSPs to implement LNP systems has made the need to transfer LNP data files quickly and efficiently to the older secondary systems even more important.

As a result of the problems described above with respect to secondary systems operating at different speeds and employing an acknowledgment receipt protocol, there is a need in the art for a system and method for transferring data files from a primary system to a number of secondary computer systems in such a way that file transfer is optimized for each of the secondary systems, thereby enabling quick and efficient use of data files. Preferably, the method and system allow for asynchronous transmission of data files to a number of systems, including legacy systems, which operate at different speeds and send acknowledgment receipts in order to receive a next file. Additionally, the system and method will preferably allow for updating information, such as, for example, LNP databases, so that the information can be utilized more quickly by various secondary systems.

SUMMARY OF THE INVENTION

Methods and systems have been developed for transferring data files in a fast and efficient manner to a number of secondary systems operating at different speeds and utilizing an acknowledgment receipt protocol. In general, the unique methods and systems include modules that utilize unique file transferring schemes. More particularly, the present disclosure describes a primary system for transferring a sequence of ordered data files, such as Local Number Portability (LNP) files, to a number of secondary computer systems.

In one embodiment of a primary system in accordance with the present invention, a receipt indicator is maintained for each of a number of secondary systems. Each receipt indicator indicates whether the receipt indicator's associated secondary system is ready to receive another data file. The primary system further maintains a status file for each of the secondary systems indicating which file the secondary system should receive next. A sequence broker reads a clear-to-send (CTS) flag to determine whether the associated secondary system is ready to receive a file. If so, the sequence broker reads the status file associated with the secondary system to determine which file is to be transferred to the secondary system. The appropriate file is then transferred. The sequence broker may iteratively sequence through each of the CTS flags, which may be updated asynchronously, and associated status files to determine when and what files to transfer to each of the secondary systems.

In another embodiment of the present invention, the system includes a CTS broker that updates CTS flags in response to messages it receives from the secondary systems. When the CTS broker receives a message from a secondary system, the CTS broker asserts a CTS flag associated with the secondary system. The sequence broker reads the asserted CTS flag, transfers a next file to the associated secondary system if the file is available, and negates the CTS flag. The CTS broker may be operably connected to the sequence broker and may invoke the sequence broker after the CTS broker asserts a CTS flag so that the sequence broker may responsively read the CTS flag. Alternatively, the sequence broker may operate independently from the CTS broker and asynchronously to the secondary systems.

Another embodiment relates to a method of transferring a sequence of data files from a primary system to a number of secondary systems utilizing CTS flags. The method includes selecting a secondary system and determining whether a CTS flag associated with the secondary system is asserted. The method further includes identifying a data file that is to be transferred to the secondary system and determining whether the data file is available for transfer. The step of identifying a data file may involve retrieving a file indicator data associated with the secondary system. If the data file is available, the data file is transferred to the secondary system. The method further includes the iteratively selecting a secondary system, determining if the secondary system is ready to receive, and transferring the next file to the secondary system, for each of the secondary systems.

Another embodiment of the invention is a unique Local Number Portability (LNP) file transfer system. Sequentially ordered LNP data files are deposited into a memory accessible by a primary system that employs the file transfer scheme. The primary system monitors whether each of the secondary systems is ready to receive another data file. The primary system may further monitor which of the sequence of data files each of the secondary systems is ready to receive. When a secondary system is ready to receive a next data file, the primary system transfers the next data file and awaits a response from the secondary system. The primary system further iterates through each of the secondary systems, determining whether each of the secondary systems is ready to receive and transferring the next file if the secondary system is ready to receive.

The various aspects of the present invention may be more clearly understood and appreciated from a review of the following detailed description of the disclosed embodiments and by reference to the drawings and claims.

DETAILED DESCRIPTION

Figure 1:
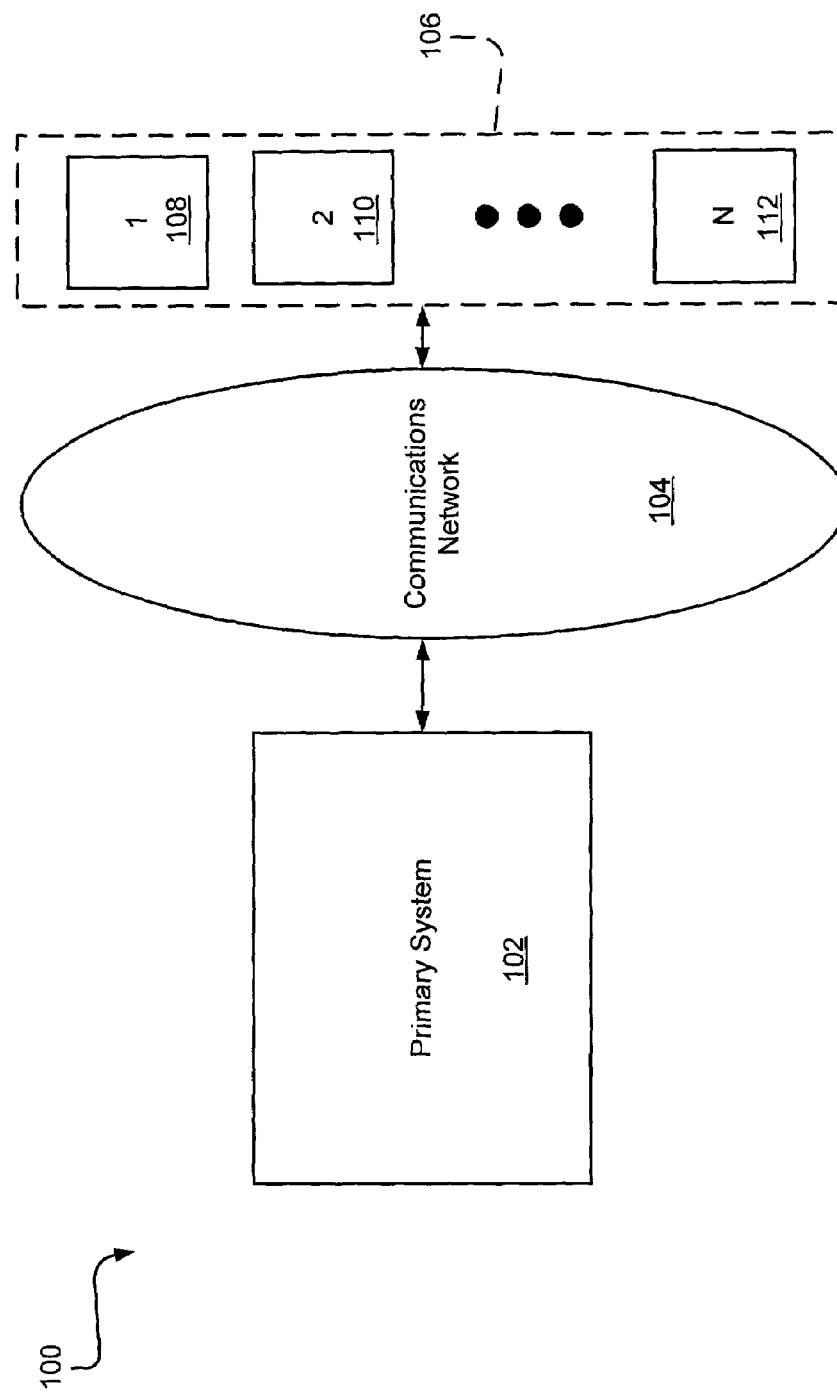
FIG. 1 illustrates a suitable communications and computing environment for implementing an embodiment of the present invention.

The invention is described in detail below with reference to the figures. When referring to the figures, like structures and elements shown throughout are indicated with like reference numerals.

In general, the following embodiments relate to methods and systems for transferring one or more data files to one or more remote computer systems. The embodiments described may be useful in any environment in which data files are to be transferred to a number of remote systems. For example, the present invention may be used with or on a mail server system. As another example, the present invention may be used with or on a medical records distribution system. In sum, the present invention may be used in any system that transfers a number of files to a number of remote systems that operate at different processing speeds and send back an acknowledgment receipt after receiving a data file.

FIG. 1 illustrates a suitable computing environment 100 for implementing an embodiment of the present invention. A primary system 102 is in operable communication with a communications network 104, whereby the primary system 102 may communicate with one or more secondary systems 106. The communication network 104 may be any communication network known in the art such as, but not limited to, wireless, Ethernet, telephone line, or direct wire connection. Further, the communication network 104 may support any communications protocol known in the art, such as, but not limited to, file transfer protocol (FTP), hypertext transport protocol (HTTP), Simple Object Access Protocol (SOAP), or any proprietary protocol. As will be discussed in more detail, the primary system 102 may be embodied in one or more computers known in the art, including, but not limited to, desktop computers, server computers, or laptop computers. The primary system 102 preferably includes a microprocessor and memory for processing and storing computer data.

The primary system 102 may store computer data in the form of data files, and may transfer the data files to the secondary systems 106. Data files are generally computer-readable files composed of binary encoded data in any format. In FIG. 1, the group of secondary systems 106 includes secondary system 1 (108), secondary system 2 (110), and so on, up to secondary system N (112). Thus, there may be any number of secondary systems among the group of secondary systems 106. The secondary systems 106 may be viewed as remote systems, operating remotely from the primary system 102. Each of the secondary systems included in the group of secondary systems 106 preferably includes one or more computer systems known in the art and is operable to receive, transmit, store, and process computer data files. The secondary systems 106 are generally remote computer systems in operable communication with the primary system 102 via the communications network 104. It is to be understood that the primary system 102 may communicate with any of the secondary systems in the group of secondary systems 106 independently.

Each of the secondary systems 108, 110, 112, employs a communications protocol wherein they each respond to the primary system 102 after they have received a data file. A response from a secondary system 108, 110, or 112, is generally an acknowledgment of file receipt. The secondary systems 108, 110, and 112, may process and/or receive data files at different rates of speed. The primary system 102 receives a file receipt acknowledgment from a secondary system when the secondary system is ready to receive a next data file. The primary system 102 monitors acknowledgment receipts to determine whether each of the secondary systems is ready to receive a next file. The primary system 102 may further keep track of which data file is to be transferred next to each of the secondary systems 108, 110, and 112. For example, if ten data files are to be sent to the secondary systems 106, the primary system 102 monitors which of the ten data files each of the secondary systems 106 has received and/or which of the ten data files each of the secondary systems 106 should receive next. The systems and methods utilized by the primary system to monitor which data file to transfer next to each of the secondary systems and when to send the data file will be discussed with regard to the embodiments shown in FIGS. 2–6.

Figure 2:
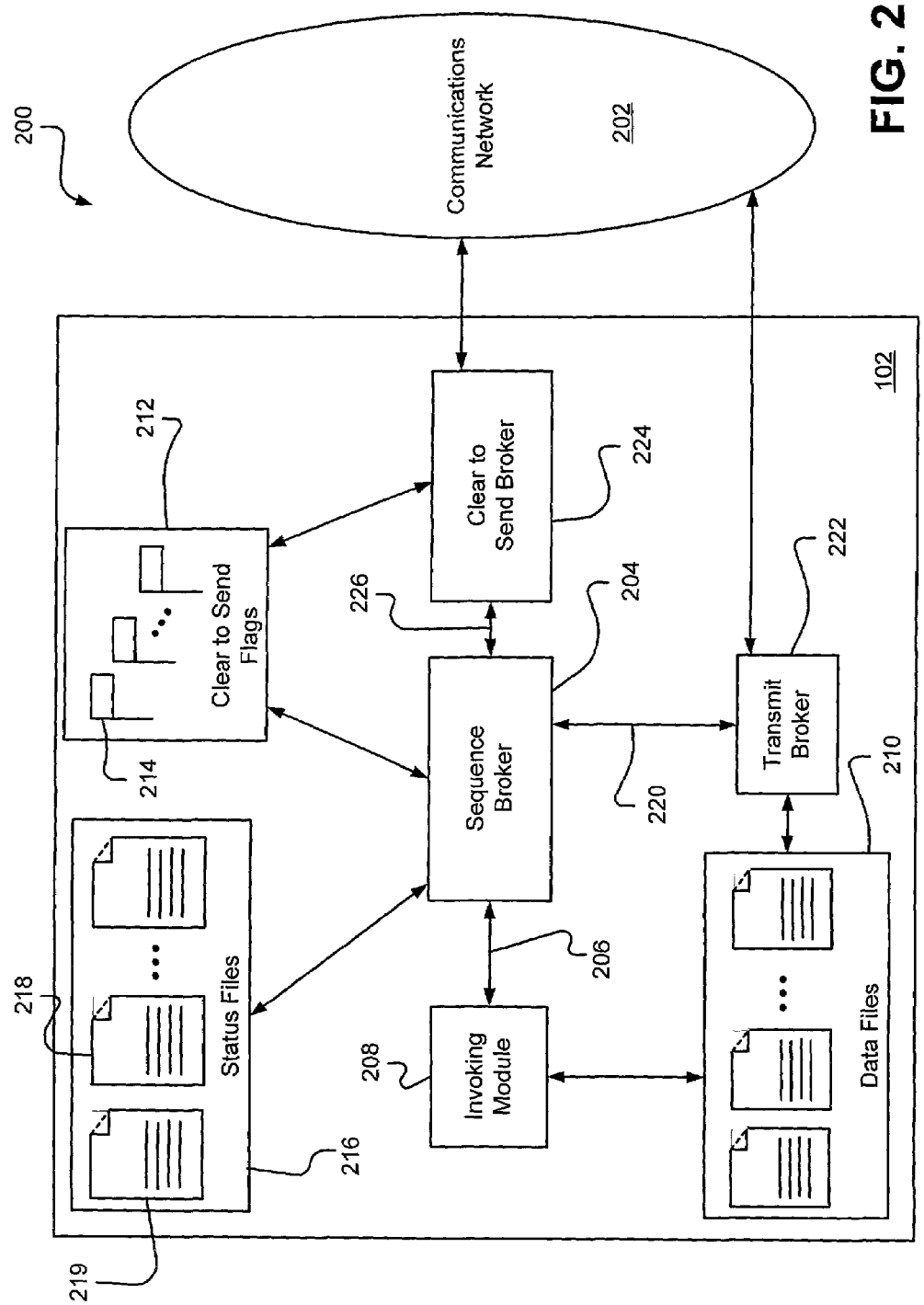
FIG. 2 is a module diagram illustrating exemplary modules in an embodiment of a primary system of the present invention.

FIG. 2 is a functional block diagram of the primary system 102, generally showing the main functional modules or subsystems in an embodiment of the primary system 102.

The primary system 102 communicates with a communications network 202, via which the primary system 102 may transfer one or more data files 210 to one or more secondary systems in a group of secondary systems 106. Data files 210 are received by the primary system 102 to be sent to the secondary systems 106. An invoking module 208 identifies when a new data file is received and notifies a sequence broker 204 of a new data file. The sequence broker 204 acts as a central process for transferring data files in a manner that takes into account processing speed differences among the secondary systems 106 and acknowledgment receipts that the secondary systems 106 send to the primary system 102. The receipt of data files 110 by the primary system 102, the transfer of the data files 110, and the subsequent response by the secondary systems 106 acknowledging receipt of a data file, generally may occur continuously and asynchronously. The sequence broker 204 manages the overall process.

The sequence broker 204 employs a set of receipt indicators 212 to monitor when each secondary system 106 is ready to receive a data file. The sequence broker 204 also employs a set of status files 216 to keep track of which data file should be sent next to each secondary system 106. The sequence broker 204 then uses a transmit broker 222 to transfer a data file from a sequence of data files 210 to a secondary system 106.

The set of receipt indicators 212 includes a set of clear-to-send (CTS) flags 214, that are each associated with a secondary system. Each CTS flag 214 in the set 212 indicates whether its associated secondary system is ready to receive another data file. Generally, each CTS flag 214 may be in either an asserted state or a negated (i.e., deasserted) state. In the asserted state, a CTS flag 214 indicates that its associated secondary system is ready to receive another data file. In the negated state, a CTS flag 214 indicates that its associated secondary system is not ready to receive another data file. The term "asserted" is used generally herein to mean any logic state suitable to the particular implementation that indicates that the associated secondary system is ready to receive another file. CTS flags 214 may be in any format recognizable by the sequence broker 204, and is preferably a binary encoded indicator. For example, each of the CTS flags 214 may comprise a single bit, wherein a bit value of one (1) represents the asserted (clear-to-send) state, and a bit value of zero (0) represents the negated (not clear-to-send) state. Those skilled in the art will recognize that a particular implementation may employ any format for the CTS flags 214, and the asserted state may be any logical expression suitable to the implementation.

The sequence broker 204 reads the CTS flag 214 to determine whether the secondary system associated with CTS flag 214 is ready to receive a data file. If the CTS flag 214 is asserted, the sequence broker 204 accesses the set of status files 216 to determine which one of the data files 210 is to be transferred. The set of status files 216 includes one or more status files 218, which are each associated with a secondary system. Each status file 218 includes a file indicator that indicates which data file is to be transferred to the associated secondary system. The file indicator can be any identifier that uniquely identifies a data file from the sequence of data files 210 and that is readable by the sequence broker 204. By way of example, and not limitation, the file indicator may be a binary encoded file name. As another example, the file indicator may be a binary encoded file number.

The status files 218 may include any general data about the secondary systems. For example, a status (e.g., operable, inoperable) of the secondary systems may be stored among the status files 218. As another example, the status files 218 may include configuration data describing the configuration of the secondary systems. Configuration data may be updated as secondary systems are added or removed from the communications network. The status data is preferably updated during the real-time operation of the file transfer system.

In a set of status files 216, each status file 218 may be a list of file indicators that refer to some or all of the data files 210. The sequence broker 204 in this embodiment may interact with the status file 218 by maintaining a pointer or reference into each of the status files 218, whereby the pointer points to the next file indicator in the list. After the sequence broker 204 reads a file indicator from the status file 218, the sequence broker increments its pointer to the next file indicator in the list. Alternatively, the status file 218 may be a linked list of entries that include a file indicator and a reference to the next entry in the status file 218. Those skilled in the art will recognize that this embodiment allows for each secondary system to have a different list of data files. Alternatively, all status files 218 in the set 216 may have the same list of file indicators. The list of file indicators in the status file 218 may be developed and written into the status file 218 continuously as data files 210 become available, or compiled ahead of time.

When the sequence broker 204 identifies a data file to transfer to a secondary system, the sequence broker 204 sends a signal or message to the transmit broker 222 commanding the transmit broker 222 to transfer the identified data file to the secondary system. The transmit broker 222 accesses the set of data files 210 and determines if the data file to be transferred exists in the set of data files 210. If the file to be transferred does exist, the transmit broker 222 transmits the identified data file to the communications network. The transmit broker 222 may include a search engine for rapidly searching the data files 210 for the identified data file. If the identified file is not available in the data files 210, the transmit broker 222 may send a message to the sequence broker 204 notifying the sequence broker 204 that the identified file does not exist. In response, the sequence broker 204 waits until the identified file is available. As is discussed in more detail below, the invoking module 208 may trigger the sequence broker 204 to retry the data file transfer.

Referring again to the transmit broker 222, the transmit broker 222 preferably includes an input/output module or receiver/transmitter module whereby the transmit broker 222 is operable to communicate to the communications network 202 via any of a number of known communications protocols. For example, it is envisioned that the transmit broker 222 may be operable to communicate via a file transfer protocol (FTP). It is further envisioned that the transmit broker 222 is operable to communicate via a hypertext transport protocol (HTTP). Thus, the transport broker 222 may transmit packetized data to the communications network. The packetized data may include an Internet Protocol (IP) address and a number of packets comprising a data file to be transferred. The IP address uniquely designates a secondary system communicating on the communications network 202.

After a secondary system receives a data file via the communications network 202, the secondary system may send a response to a CTS broker 224 via the communications network 202. The CTS broker 224 accesses the CTS flags 212 and asserts one of the flags 214 to indicate that the associated secondary system is ready to receive the next data file. The CTS broker 224 may also issue a CTS command 226 to the sequence broker 204 to notify the sequence broker 204 that the CTS flags 212 have been updated.

A CTS broker 224 receives acknowledgment receipts from the secondary systems 106. An acknowledgment receipt is generally any message or signal from a secondary system 106 indicating that the secondary system is ready to receive another data file. The acknowledgment receipt includes a unique identifier identifying the secondary system that sent the acknowledgment receipt. For example, the acknowledgment receipt may include an Internet Protocol (IP) address. The acknowledgment receipt is received from secondary systems 106 via the communications network 202. The CTS broker 224 includes a receiver for receiving data from the communications network 202. In response to receiving an acknowledgment receipt from a secondary system 106, the CTS broker 224 asserts one of the receipt indicators 216 associated with the secondary system 106.

The sequence broker 204 monitors the receipt status of each of the secondary systems by iterating through each of their associated CTS flags 214. In one embodiment of the primary system 102, sequence broker 204 operates independently from the CTS broker 224. The sequence broker 204 monitors the receipt indicators 216 in a substantially periodically, at times that are independent from when the secondary systems 106 send acknowledgment receipts. For example, the sequence broker 204 may operate on a system clock, whereby the sequence broker 204 checks the receipt indicators 216 on every clock cycle. The CTS broker 224 asserts the receipt indicators 216 when an acknowledgment receipt is received, which may be asynchronous to the monitoring schedule used by the sequence broker 204.

In an alternative embodiment, the CTS broker 224 is in operable communication with the sequence broker 204 so that the CTS broker 224 may notify the sequence broker 204 when one of the receipt indicators 216 is asserted. Thus, an invoking signal 226 may be sent from the CTS broker 224 to the sequence broker 204 when the CTS broker 224 asserts a receipt indicator 216 in response to receiving an acknowledgment receipt from one of the secondary systems 106. In this alternative embodiment, the sequence broker 204 may monitor the receipt indicators 216 in response to the invoking signal 226. The invoking signal may be in any format recognizable by the sequence broker 204 and preferably includes an identifier that identifies which one of the receipt indicators 216 was asserted most recently.

The computer data files 210 may be sequentially ordered. It is envisioned that any ordering scheme may be used. By way of example, and not limitation, the data files 210 may be numerically ordered. As another example, the data files 210 may be alphabetically ordered. Still further, the data files 210 may be geographically ordered. The data files 210 may be generated within the primary system 102 or the data files may be received by the primary system 102 from a remote system communicating to the primary system 102. The data files 210 may be stored on any memory suitable to the implementation, such as, but not limited to, a database. An invoking module 208 may generate the data files 210 or receive data files from another computer and deposit the data files 210 into a local database.

The invoking module 208 monitors when a data file is deposited into the data files 210. The invoking module 208 is in operable communication with the sequence broker 204. In response to the data files 210 receiving a data file, the invoking module 208 may notify the sequence broker 204 with an invoking command 206 that a new data file is available to be transferred. The invoking command 206 may be any medium recognizable by the sequence broker 204, such as an electromagnetic signal or a magnetic state in a memory medium. The invoking command 206 may be in any format, and preferably includes at least two states, whereby one state can indicate a new data file exists and the other state indicates that the sequence broker 204 has been notified of all the data files 210 in the database. Additionally, the invoking command 206 may include file indicator data indicating which data file has been deposited in the data files 210.

In one scenario, the sequence broker 204 may wait for the invoking command 206 before transferring a data file. This scenario generally occurs when the sequence broker 204 has checked the receipt indicators 216, and has determined that a secondary system is ready to receive another data file. Then the sequence broker 204 accesses a status file associated with the secondary system to determine which data file is to be transferred to the secondary system. The sequence broker 204 may then access the data files 210 to determine if the data file is available to be transferred. If the data file is not available yet in the data files 210, then the sequence broker 204 waits for the data file to become available. When this happens, the sequence broker 204 may use the invoking command 206 to trigger transfer of the data file.

The data files 210, the clear-to-send flags 212 and the status files 216, are preferably stored in memory accessible by one or more microprocessors of the primary system 102. The memory that stores the data files 210, the clear-to-send flags 212, and the status files 216 can be any memory medium known in the art, including, but not limited to, Personal Computer Memory Card International Association (PCMCIA) memory, Random Access Memory (RAM), Read Only Memory (ROM), Electrically Erasable Programmable ROM (EEPROM), or hard disc drive memory. It should be understood that the data files 210, the clear-to-send flags 212, and the status files 216, need not be stored contiguously in memory and may be broken apart in a memory medium accessible through a file system that maps memory locations to data. In practice, one or more of the modules shown in FIG. 2 may be integrated on a single integrated circuit in any combination. Alternatively, they may be separately implemented in software or hardware.

In embodiments described herein, the logical operations of the primary system 102 may be implemented as a sequence of computer implemented steps or program modules running on a microprocessor, such as, without limitation, a processor in a personal computer or a computer workstation. It will be understood to those skilled in the art that the primary system 102 of the present invention may also be implemented as interconnected machine logic circuits or circuit modules within a computing system. The implementation is a matter of choice dependent on the performance requirements of the computing system implementing the primary system 102. The operation, structural devices, acts, and/or modules described herein may be implemented in software, in firmware, in special purpose digital logic, and/or any combination thereof without deviating from the spirit and scope of the present invention as recited within the claims attached hereto. Furthermore, the various software routines or software modules described herein may be implemented by any means known in the art. For example, any number of computer programming languages, such as "C", "C++", Pascal, FORTRAN, assembly language, Java, etc., may be used. By way of further example, and not limitation, any scripting language known in the art may be used, such as Korn shell script. Furthermore, various programming approaches such as procedural, object oriented or artificial intelligence techniques may be employed.

Figure 3:
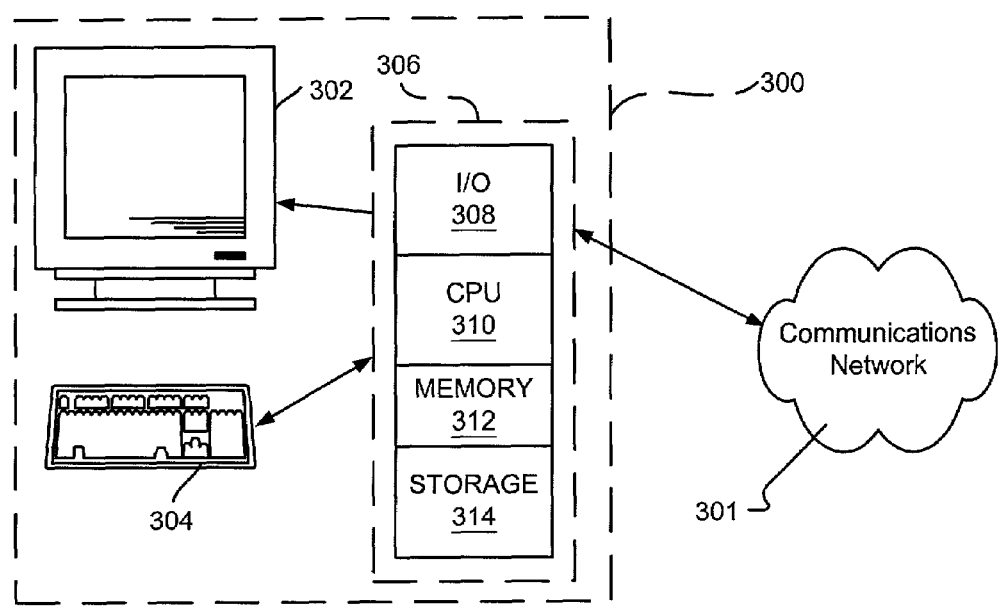
FIG. 3 illustrates a general purpose computer that may embody the primary system shown in FIG. 2.

The primary system 102 and the secondary systems 106 may be implemented as software modules executed by one or more general purpose computers, such as the general purpose computer 300 illustrated in FIG. 3. As described in greater detail below, the primary system 102 may be employed to generate, receive, and/or store a sequence of data files, such as Local Number Portability (LNP) data files, for delivery to, and storage in, a number of secondary systems 106 via a communications network 301. In the system shown in FIG. 3, LNP data for the secondary systems 106 is input to the computer 300, which, in turn, employs the primary system 102 to transfer the LNP data files to the secondary systems 106. Some of the elements of a general purpose computer 300 shown in FIG. 3 include a monitor 302, a keyboard 304, a processor 306 having an input/output (I/O) section 308, a Central Processing Unit (CPU) 310, a memory section 312, and a non-volatile storage device 314, such as a disk drive, a CD-ROM, or the like. Although many other internal components of the general purpose computer 300 are not shown, those of ordinary skill in the art will appreciate that such components and their interconnections are well known.

Computer-readable instructions may be included in computer-readable media. Computer-readable media can be any available media that can be accessed by the computer or processor. By way of example, and not limitation, computer-readable media might comprise computer storage media and/or communication media.

Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Erasable Programmable ROM (EPROM), flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by the computer or processor which is executing the operating code.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

Figure 4:
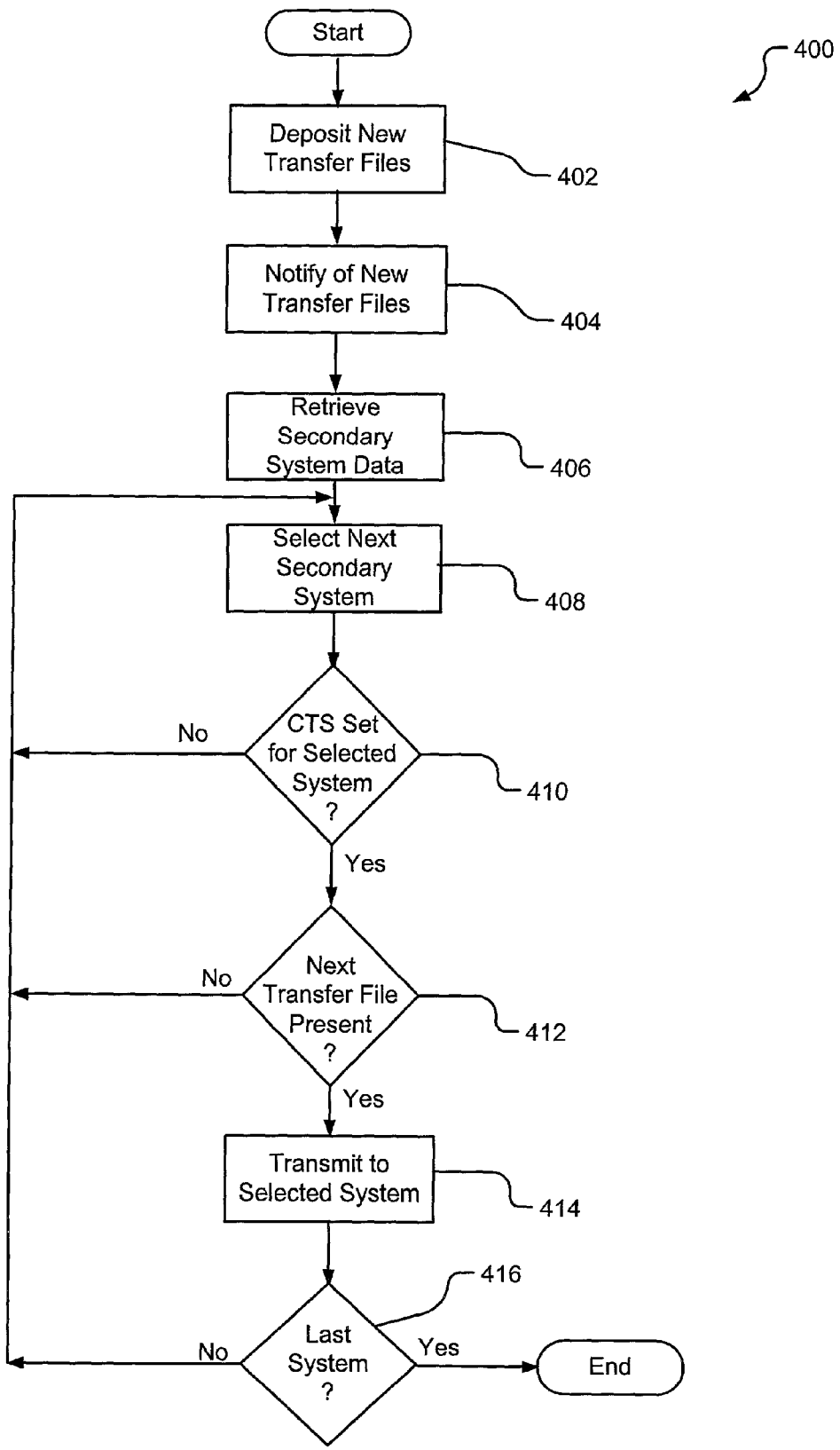
FIG. 4 illustrates an operational flow of the invoking process in accordance with an embodiment of the present invention.

FIG. 4 is a diagram that illustrates an operational flow 400 of an invoking process in accordance with an exemplary embodiment of the present invention. The method steps illustrated in operational flow 400 are exemplary method steps that may be implemented by one or more of the modules in the primary system 102 shown in FIG. 2. For example, the invoking module 208 may invoke the sequence broker 204 when new data files are available.

First, a depositing operation 402 deposits new data files in memory accessible by the primary system 102. Preferably the data files are deposited in a memory medium such as a database that is accessible by the transmit broker 222 so that the data files can be transferred to the secondary systems 106. Then, a notifying operation 404 notifies the sequence broker 204 that new data files are available to be transferred. A retrieving operation 406 then retrieves secondary system data to determine which file is next to be sent to each of the secondary systems 106. The retrieving operation 406 may include accessing the status files 216 to determine which data file should be sent to the secondary system. A selecting operation 408 selects the next secondary system to determine if it is clear to send and to determine which data files should be transferred next.

The determining operation 410 determines whether the clear-to-send flag in a selected system is asserted. If the clear-to-send flag is not asserted, the selecting operation selects the next secondary system. If the CTS flag is asserted, a determining operation 412 determines whether the next data file is present in the set of data files. If the next data file is not present, control transfers to the selecting operation 408 to select the next secondary system. If the next data file is available, control transfers to a transmitting operation 414 that transmits the data file to the secondary system. A determining operation 416 determines whether all of the secondary systems have been checked for clear-to-send. If more secondary systems remain to be checked, the selecting operation 408 selects the next secondary system. If no more secondary systems remain to be checked, an ending operation ends the process.

Figure 5:
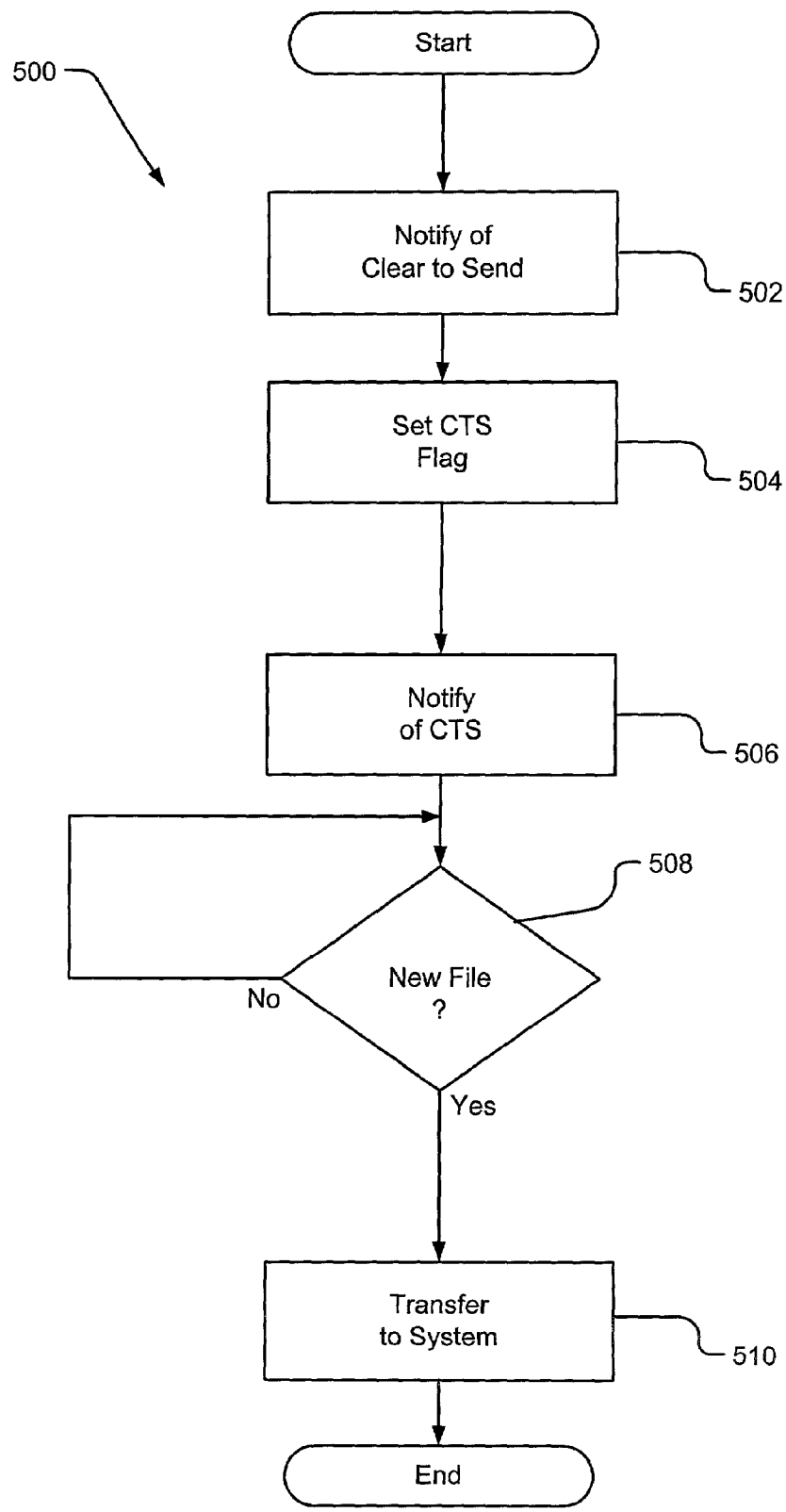
FIG. 5 illustrates an operational flow of the clear-to-send process in accordance with an embodiment of the present invention.

FIG. 5 is a diagram that illustrates an operational flow 500 of the clear-to-send process in accordance with an embodiment of the present invention. A notifying operation 502 notifies the clear-to-send broker 224 that the secondary system is ready to receive a new data file. The notifying operation 502 involves receiving a response from a secondary system indicating the secondary system received the last data file and is ready to receive the next data file. Notification in the notifying operation 502 may take any form including sending a packetized message having an identifier for the secondary system that is acknowledging receipt. An asserting operation 504 asserts an associated CTS flag in response to the notifying operation 502. In the asserting operation 504 a flag in the clear-to-send flags 212 associated with a secondary system is asserted to indicate that the secondary system is ready to receive another data file. A notifying operation 506 notifies the sequence broker 204 that a clear-to-send flag has been updated. The notifying operation 506 may invoke the sequence module 204 to check the status files 216 and transfer the next data file. A determining operation 508 determines whether a new data file is available to be sent. The determining operation 508 reads the data files 210 to determine if the next data file is available. The determining operation 508 continues to query whether a next data file is available until the next data file becomes available. When the next data file becomes available, the transferring operation 510 transfers the next data file to the secondary system.

Figure 6:
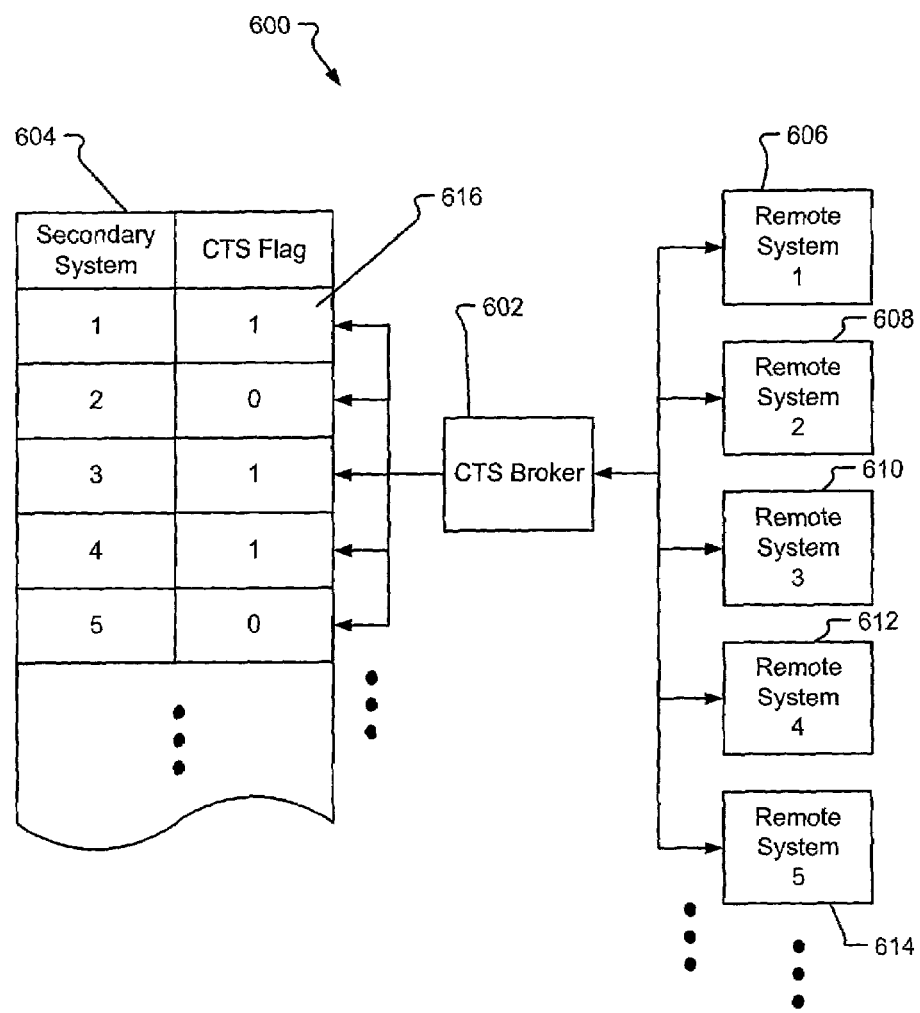
FIG. 6 depicts the clear-to-send broker in operable communication with secondary systems and a clear-to-send table in accordance with an embodiment of the present invention.

FIG. 6 depicts the CTS broker 602 in operable communication with secondary systems and a CTS table 604. The illustration in FIG. 6 is intended to assist the reader in understanding the CTS broker and how CTS flags are used to manage the file transfer process. The CTS table 604 may be implemented as a computer-readable binary encoded relational table stored in memory. The secondary systems are depicted by remote system 1 (606), remote system 2

(608), remote system 3 (610), remote system 4 (612), and remote system 5 (614). The CTS table 604 contains a CTS flag associated with each of the secondary systems. For example, the CTS flag 616 is associated with remote system 1 (606). The CTS flag 616 is set to one (1) in the illustration, which may indicate that the CTS flag 616 is asserted and the remote system 1 (606) is ready to receive another data file. As was discussed, when the remote system 1 (606) receives a data file, the remote system 1 (606) responds to the CTS broker 602 with a receipt acknowledgment message. The CTS broker 602, in response, asserts the associated CTS flag 616. As discussed earlier, the sequence broker 204 reads the CTS flag 616 to determine if remote system 1 (606) is ready to receive another data file.

One example of where the previously described embodiments may be useful is in a Local Number Portability (LNP) system. To facilitate an understanding of the present invention, various embodiments of the present invention will now be describe with respect to their use in processing Local Number Portability (LNP) files for distribution to a number of secondary systems, such as telecommunications legacy systems. As shown in FIG. 2, the primary system 102 includes or has access to a number of LNP data files. In one embodiment, these LNP data files may be stored in a database in the primary system. The LNP data files may be transferred to the primary system from a remote system and then stored in the database or, as described below, they may be generated within the primary system and stored in the database. Once the LNP files have been stored in the database, they will be transferred to the secondary systems as described in detail below. As will be understood, the storage of the LNP files in the database may occur in a single storage operation or, the LNP data files may be stored in the database as they are created or received. Furthermore, as described below, the LNP data files in the primary system and are transferred in an asynchronous manner to the secondary systems. Before sending LNP files to the secondary systems, the secondary system sends an acknowledgment receipt to the primary system when indicating the secondary system is ready to receive another LNP data file. The LNP data files may be in a sequential order and the primary system may send the LNP data files to each of the secondary systems in the sequential order. Primary systems described in the following embodiments are applicable to LNP systems; however, it will be understood that the systems describe herein are not limited to LNP systems.

The logical operations of the various embodiments of the present invention may be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Although the present invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method of transferring one or more data files to a computer system comprising:
    determining whether a clear-to-send flag associated with the computer system is asserted;
    transferring a data file to the computer system if the clear-to-send flag is asserted;
    receiving a receipt acknowledgment from the computer system indicating that the computer system received the data file; and
    reasserting the clear-to-send flag in response to receiving the receipt acknowledgment,
    wherein the one or more data files are in a sequential order and the method further comprises:
    reading a status file associated with the computer system, wherein the status file includes a file indicator indicating which of the one or more data files should be transferred to the computer system;
    determining a data file to transfer to the computer system based on a file indicator; and
    updating the file indicator to indicate the next file in the sequence of the one or more data files.

2. A method of transferring one or more data files to a computer system comprising:
    determining whether a clear-to-send flag associated with the computer system is asserted;
    transferring a data file to the computer system if the clear-to-send flag is asserted;
    receiving a receipt acknowledgment from the computer system indicating that the computer system received the data file;
    reasserting the clear-to-send flag in response to receiving the receipt acknowledgment,
    receiving an invoking command indicating that another data file is available to be transferred; and
    invoking the determining, and transferring steps.

3. A method of transferring a sequence of data files from a primary system to a plurality of secondary systems, wherein each of the secondary systems responds after receiving a data file, the method comprising:
    selecting a first secondary system;
    determining whether a clear-to-send (CTS) flag associated with the first secondary system is asserted;
    identifying a first data file that is to be transferred to the first secondary system;
    determining whether the first data file is available for transfer; and
    if the first data file is available and if the CTS flag is asserted, transferring the first data file to the first secondary system.

4. The method of claim 3 further comprising:
    repeating the selecting, determining, identifying, determining, and transferring steps for each of the plurality of secondary systems.

5. The method of claim 4 wherein identifying comprises:
    retrieving secondary system data associated with the first secondary system, wherein the secondary system data includes a data file indicator indicating which of the sequence of data files is to be transferred to the first secondary system.

6. The method of claim 3 further comprising:

depositing a data file into the sequence of data files.

7. A computer readable medium having computer-executable instructions for performing the method steps of claim 3.

8. A primary system for transferring a plurality of sequentially ordered data files to a plurality of secondary systems comprising:

- a sequence broker operable to read a clear-to-send flag associated with one of the secondary systems, identify one of the data files to be transferred to the secondary system, and issue a transfer command to transfer the identified data file;
- a transmit broker in operable communication with the sequence broker receiving the transfer command and responsively transferring the identified data file to the secondary system; and
- a clear-to-send broker operable to receive an acknowledgment from the secondary system and responsively assert the clear-to-send flag associated with the secondary system.

9. The system of claim 8 further comprising:

- a database for receiving and storing the plurality of sequentially ordered data files;
- an invoking module in operable communication with the sequence broker and the database, the invoking module storing the plurality of sequentially ordered data files in the database and issuing a new file command to the sequence broker, the new file command notifying the sequence broker that the database has data files stored in it.

10. The primary system of claim 8 wherein the clear-to-send module is in operable communication with the sequence broker and the clear-to-send module is operable to send an invoking command to the sequence broker after asserting the clear-to-send flag.

11. The system of claim 8 wherein the primary system is in operable communication with the secondary systems via a communications network.

12. The system of claim 11 wherein the communications network is the Internet.

* * * * *